United States Patent [19]
Rodgers

[11] Patent Number: 5,510,773
[45] Date of Patent: Apr. 23, 1996

[54] LOW BURDEN VISUAL POWER-ON INDICATOR FOR A SELF-POWERED CIRCUIT PROTECTION DEVICE

[75] Inventor: Barry Rodgers, Raleigh, N.C.

[73] Assignee: Square D Company, Palatine, Ill.

[21] Appl. No.: 323,469

[22] Filed: Oct. 14, 1994

[51] Int. Cl.$^6$ ................................................ G08B 21/00
[52] U.S. Cl. ........................ 340/638; 340/635; 340/546;
340/657; 324/133; 335/17
[58] Field of Search .................................... 340/638, 635,
340/546, 657, 661, 662, 663, 636, 641,
644, 645; 324/127, 133; 335/17; 361/93

[56] References Cited

U.S. PATENT DOCUMENTS

| | | | |
|---|---|---|---|
| 4,148,024 | 4/1979 | Kuhn et al. | 340/638 |
| 4,556,874 | 12/1985 | Becker | 340/638 |
| 4,570,155 | 2/1986 | Skarman et al. | 340/628 |
| 4,931,778 | 6/1990 | Guajardo | 340/638 |
| 4,952,915 | 8/1990 | Jenkins et al. | 340/638 |
| 5,283,553 | 2/1994 | Ishii et al. | 340/638 |

*Primary Examiner*—Brent A. Swarthout
*Assistant Examiner*—Benjamin C. Lee
*Attorney, Agent, or Firm*—Larry I. Golden; David Russell Stacey; Larry T. Shrout

[57] ABSTRACT

The present invention provides a low burden visual POWER ON indicator for a self-powered electrical circuit protection device. The visual indicator includes a current transformer for producing an induced current in direct proportion to the current supplied to an electrical device protected by the protection device. The induced current is summed and rectified. An energy accumulator stores a predetermined voltage required to operate the protection device. The stored voltage is controlled by an accumulation switch which in turn is controlled by a hysteresis control circuit. The hysteresis control circuit includes an operational amplifier which is biased by a stable reference voltage. When the voltage on the energy accumulator is equal to the stable reference voltage the operational amplifier produces a HIGH output signal. When the voltage on the energy accumulator is less than the stable reference voltage the operational amplifier produces a LOW output signal. A HIGH output signal causes the power accumulation switch to close thereby diverting current away from the energy accumulator. A LOW output signal opens the power accumulation switch causing current to flow to the energy accumulator thereby charging it. An LED is electrically connected to the operational amplifier such that it is illuminated only when the operational amplifier produces a HIGH output signal and thereby provides a visual indication of the POWER ON state of the protection device.

4 Claims, 3 Drawing Sheets

5,510,773

LOW BURDEN VISUAL POWER-ON INDICATOR FOR A SELF-POWERED CIRCUIT PROTECTION DEVICE

FIELD OF THE INVENTION

The invention relates to visual POWER ON indicators and specifically to visual POWER ON indicators for self-powered circuit protection devices.

BACKGROUND OF THE INVENTION

It is common to use some form of visual POWER ON indication in modern electronic circuit protection devices. This is usually provided in the form of a light emitting diode (LED) which is illuminated when power is supplied to the protection device. Power for the LED is normally supplied by the same source which provides power to the circuit protection device. This is not a problem when an external power source is used. However, when the circuit protection device is a small self-powered device, such as disclosed in U.S. patent application No. 08/143,948, entitled "Self-Powered Circuit Interruption Arrangement" and U.S. patent application No. 08/147,280, entitled "Energy Validation Arrangement for a Self-Powered Circuit Interrupter" both assigned to the instant assignee and filed on Oct. 27, 1993, and incorporated herein by reference, the amount of available power is very small. Self-powered devices receive their operating power from one or more current transformers which monitor the power supplied to the protected device and provide a signal proportional to the monitored power to the overload protection circuit. This eliminates the cost of extra components required for a separate power supply and allows the circuit protection device to be small in physical size. Because the current transformers are also designed for optimum efficiency and size, they produce just enough power to operate the circuit protection device and an electromechanical trip device. The power required to illuminate even the most efficient LED's may be equal to or greater than the power required to operate the electromechanical trip device. Transformers designed to produce the extra current required to continuously illuminate the LED must be physically larger, thereby requiring a larger enclosure for the circuit protection device and increasing the cost of the protection device. If the current transformer is not designed to produce the current required to continuously illuminate the LED, the available power is reduced significantly thereby having a detrimental effect on the operation of the circuit! protection device. The additional burden placed on the current transformers by the current flowing to the LED increases any error in the signal from the current transformers to the overload detection circuit. This error could cause the electromechanical trip device to operate late, or possibly not at all. This could result in possible damage to the protected device. It is desirable to provide a visual POWER ON indicator for a self-powered device which permits smaller current transformers of optimum design to be used without significantly increasing the burden on the current transformers and the resultant detrimental effect on the operation of the circuit protection device.

SUMMARY OF THE INVENTION

The present invention provides a low-burden visual POWER ON indicator for a self-powered circuit protection device wherein the POWER ON indicator does not significantly increase the burden on the current transformers above the minimum current required to operate the circuit protection device and the electromechanical trip device. This is accomplished by incorporating a power sharing scheme in which the POWER ON indicator receives power for illumination only when the energy accumulator (capacitor) for the circuit protection device is fully charged. By doing so the average current draw on the current transformers is only slightly above the minimum required to operate the circuit protection device and the electromechanical trip device. The circuity of the protection device includes a hysteresis control circuit which controls a power accumulation switch which in turn controls the charging of the energy accumulator capacitor. The hysteresis control circuit includes an operational amplifier functioning as a comparator which is biased by a stable reference voltage. For this application the stable reference voltage may be defined as that voltage required to operate the electromechanical trip mechanism of the circuit protection device. When the charge on the capacitor is equal to the stable reference voltage the operational amplifier produces a HIGH output signal. The HIGH output signal causes the power accumulation switch to close thereby diverting current flow away from the energy accumulator capacitor to the circuit common through a burden resistor. As voltage on the energy accumulator capacitor drops below the stable reference voltage the operational amplifier produces a LOW output signal. The LOW output signal causes the power accumulation switch to close causing current to flow to the energy accumulator capacitor thereby charging it. The POWER ON indicator LED is located in the output circuit of the operational amplifier. Therefore, when the operational amplifier produces a HIGH output signal closing the power accumulation switch it also causes current to flow through the LED thereby illuminating it. When the operational amplifier produces a LOW output signal opening the power accumulation switch it stops the current flow through the LED thereby causing it to stop illuminating. Since the visual POWER ON indicator LED is only illuminated when the energy accumulator capacitor is sufficiently charged, it does not significantly increase the burden on the current transformers. Therefore, any error in the signal supplied by the current transformers to the over current detector circuit which might be attributed to the LED current draw is minimized. This circuit arrangement allows the current transformers to be designed for small physical size, high accuracy and low cost.

Other features and advantages of the invention will become apparent to those skilled in the art upon review of the following detailed description, claims and drawings.

Figure 1:
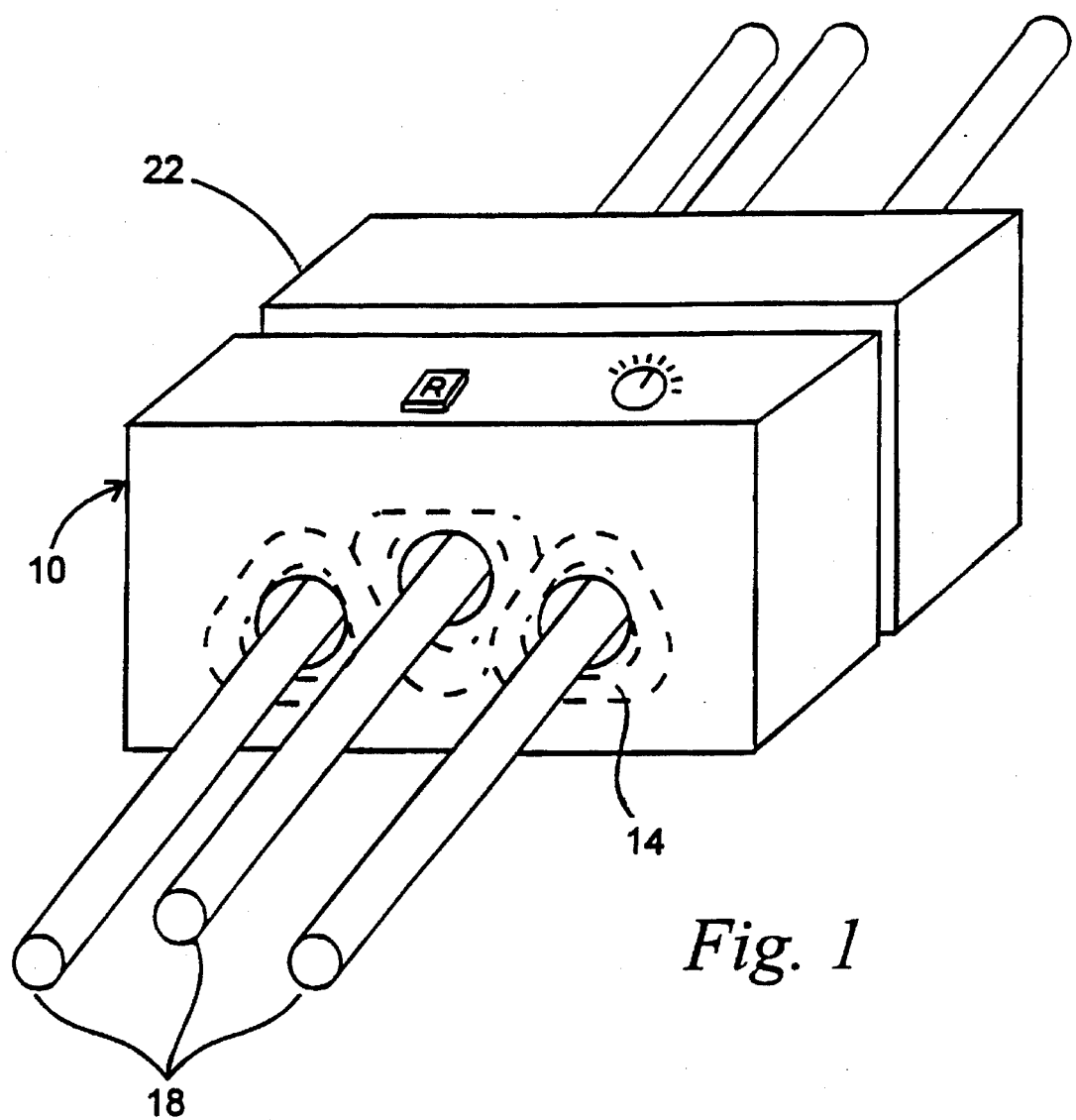
FIG. 1 is a schematic illustration of a typical self-powered circuit protection system in accordance with the present invention.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DETAILED DESCRIPTION OF THE INVENTION

FIG. 1 illustrates a self-powered circuit protection device generally indicated by reference numeral 10. The device 10 derives its power from a three phase current transformer 14 (or one individual transformer per phase) which provides an induced current proportional to the current flowing in electrical conductors 18 passing through it. The conductors 18 provide power to an electrical device, such as an electric motor, which is protected by the circuit protection device 10. A conventional contactor 22, such as Square D Class 8502, Type SA012, is employed to interrupt current flowing in the conductors 18 in response to a signal from the circuit protection device 10.

Figure 2:
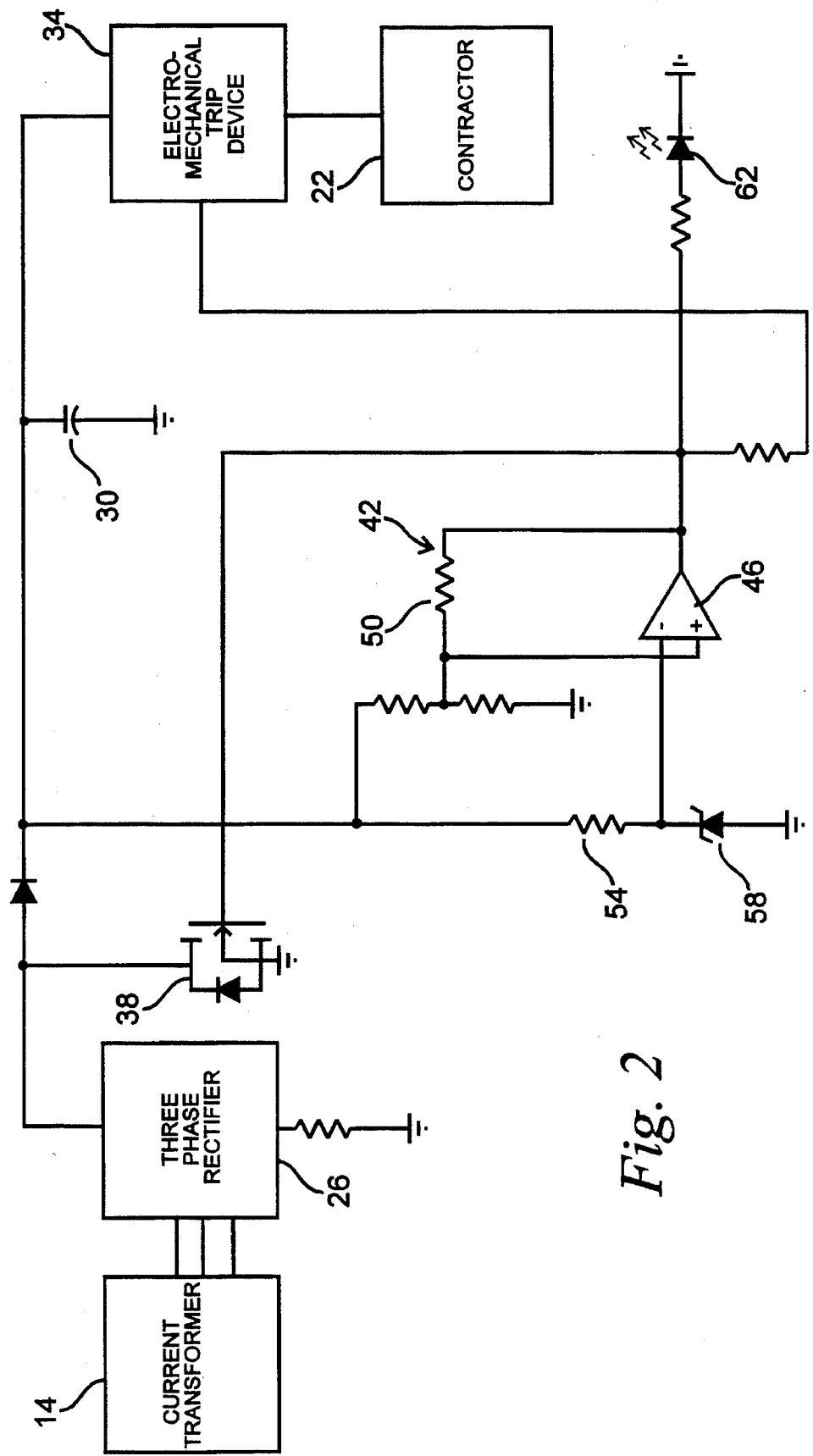
FIG. 2 is a circuit diagram of a self-powered circuit protection device in accordance with the present invention.

As shown in FIG. 2, the induced current from the current transformers 14 passes through a full wave rectifier 26 and is then summed to produce a DC output. An energy accumulator 30 in the form of a capacitor stores sufficient energy to operate the device 10 and to energize an electromechanical trip device such as a trip solenoid 34 which causes the contactor 22 to open thereby interrupting current to the protected device. The current transformers 14 are designed for optimum efficiency, size and cost. Therefore, the current transformers 14 supply only enough power to operate the circuit 10 and energize the trip solenoid 34. Charging of the energy accumulator 30 is controlled by a power accumulation switch 38 which, in this embodiment, is a FET. The power accumulation switch 38 diverts current flow to the energy accumulator 30 when its charge is low and away from the energy accumulator 30 when its charge is sufficient to operate the circuit protection device 10 and to energize the trip solenoid 34. The power accumulation switch 38 is controlled by a hysteresis control circuit 42 which includes an operational amplifier 46 and a feed back circuit 50 connected between an output and an input of the operational amplifier 46. The negative input of the operational amplifier 46 is biased by a stable reference voltage. The stable reference voltage is provided by the interconnection of a resistor 54 and a bandgap reference 58. The value of the stable reference voltage is chosen such that the energy accumulator 30 will have sufficient energy to operate the trip solenoid 34. When the voltage of the energy accumulator 30 is equal to the stable reference voltage the operational amplifier 46 produces a HIGH output signal. The HIGH output signal causes the power accumulation switch 38 to close thereby diverting current flow away from the energy accumulator 30 to the circuit common. When the voltage of the energy accumulator 30 is less than the stable reference voltage the operational amplifier 46 produces a LOW output signal. The LOW output signal causes the power accumulation switch 38 to open thereby diverting current flow to the energy accumulator 30 so that it may charge. A visual POWER ON indicator in the form of a LED 62 is located in the output circuit of the operational amplifier 46 such that the LED 62 is illuminated only when the operational amplifier 46 has a HIGH output.

Figure 3:
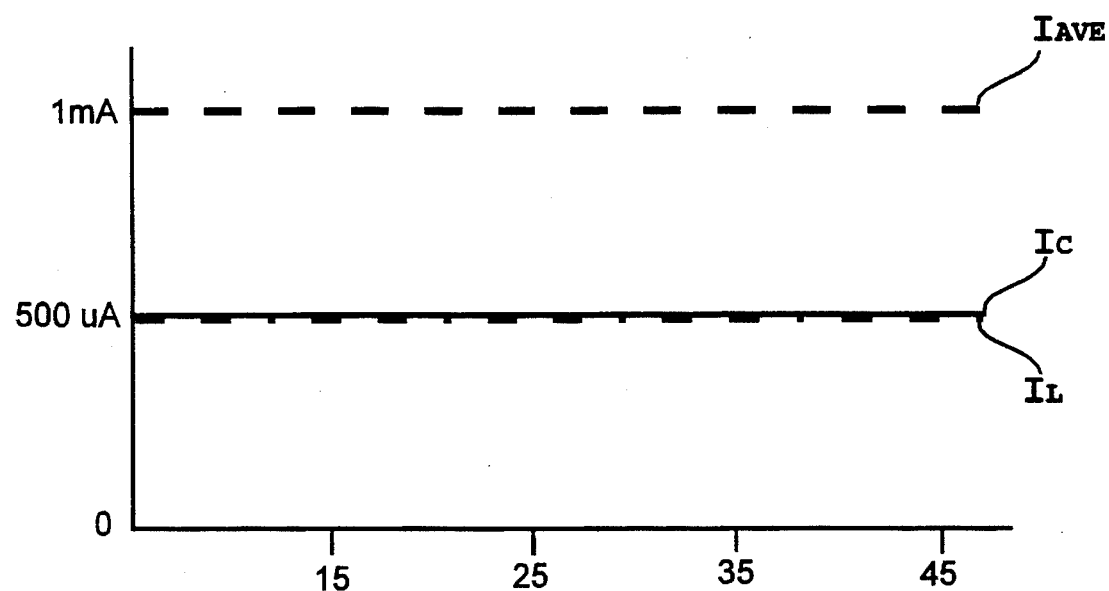
FIG. 3 is a diagram illustrating the current draw on the current transformers in a system in which the visual POWER ON indicator is continuously illuminated.
Figure 4:
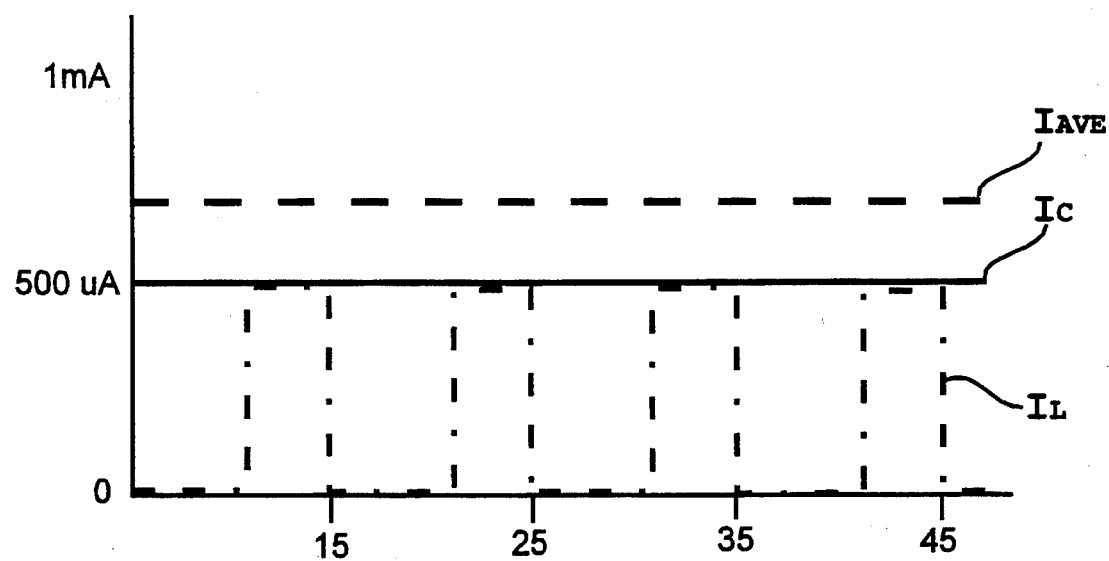
FIG. 4 is a diagram of the current draw on the current transformers in a system in which the visual POWER ON indicator is intermittently illuminated in accordance with the present invention.

FIGS. 3 and 4 are graphs which illustrate the current draw required from two hypothetical circuits, one having a continuously illuminated LED 62, the other, in accordance with the present invention, having the LED 62 illuminated only when the energy accumulator 30 is sufficiently charged. For the purpose of this illustration the hypothetical circuit of the protection device 10 and energy accumulator capacitor 30 require 500 µA ($I_c$) for operation, the capacitor requiring 400 ms to charge and 600 ms to discharge, and that the hypothetical LED 62 requiring 500 µA ($I_1$) for illumination. It is also assumed that the hypothetical current transformers 14 have been designed to produce an output of 500 µA as required to operate the protection device circuit and charge the energy accumulator capacitor 30.

The graph of FIG. 3 illustrates the current draw for a circuit in which the LED 62 is continuously illuminated. In this illustration the average current draw required from the current transformer 14 is $I_{ave}=I_1+I_c$ or 500 µA+500 µA=1 mA. This represents a 100% increase in the current draw required to operate the circuit protection device 10.

The graph of FIG. 4 illustrates the current draw for a circuit in accordance with the present invention in which the LED 62 is illuminated only when the energy accumulator capacitor 30 is fully charged. In this illustration the average current draw required from the current transformer 14 is $I_{ave}=I_1\times(T_{on}/(T_{on}+T_{off}))+I_c$ or 500 µA+500 µA×(400 ms/(400 ms+600 ms))=700 µA. This equates to a 40% increase in the current draw required to operate the circuit protection device 10. By comparing the $I_{ave}$ of FIG. 3 with that of FIG. 4 it can be seen that a device having continuous illumination of the LED 62 has a significantly larger current draw than a device having pulsed illumination of the LED 62. In transformer design the current produced by the transformer is proportional to the iron content of the transformer core. Increasing the iron content of the core to produce the required current output increases the physical size of the transformer and the cost of manufacturing the transformer. The accuracy of the overload detection circuit is also adversely effected in proportion to the additional current draw required by the device above that which the transformer was designed to produce. Increasing the iron content of the transformer core by a small amount such that the current output required by the pulsed LED 62 is produced allows the circuit protection device to maintain accuracy while holding physical size and manufacturing cost to a minimum.

I claim:

1. A low burden visual POWER ON indicator for a self-powered electrical circuit protection device, said low burden visual POWER ON indicator comprising in combination:

a current transformer coupled to a protected electrical device for producing an induced current directly proportional to a current supplied to said protected electrical device;

means for rectifying said induced current;

an energy accumulator for storing an accumulated voltage supplied by said rectifying means;

means for providing a stable reference voltage;

an operational amplifier electrically connected to said energy accumulator and biased by said stable reference voltage such that when said accumulated voltage is equal to said stable reference voltage said operational amplifier produces a HIGH output signal and when said accumulated voltage is less than said stable reference voltage said operational amplifier produces a LOW output signal;

a power accumulation switch being electrically connected to said energy accumulator and said rectifying means, said power accumulation switch being switchable between an energy accumulating state in response to said LOW output signal of said operational amplifier and a non-accumulating state in response to said HIGH output signal of said operational amplifier, whereby in said energy accumulating state said induced current is directed to said energy accumulator such that said accumulating voltage may be stored therein and in said non-accumulating state said induced current is diverted away from said energy accumulator to an LED; and said LED being electrically connected to said operational amplifier such that said LED is illuminated only when said operational amplifier produces said HIGH output signal thereby providing a visual indication of a POWER ON state of said protection device.

2. The device of claim 1 wherein said energy accumulator is a capacitor.

3. The device of claim 1 wherein said power accumulation switch is a transistor.

4. The device of claim 3 wherein said transistor is a FET.

* * * * *